(12) United States Patent
Meyers

(10) Patent No.: US 8,656,272 B2
(45) Date of Patent: Feb. 18, 2014

(54) PERSISTING INSTANCE-LEVEL REPORT CUSTOMIZATIONS

(75) Inventor: Robert A. Meyers, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1491 days.

(21) Appl. No.: 11/413,227

(22) Filed: Apr. 28, 2006

(65) Prior Publication Data

US 2007/0256006 A1 Nov. 1, 2007

(51) Int. Cl.
*G06F 17/00* (2006.01)
(52) U.S. Cl.
USPC ............................. 715/220; 707/759; 707/713
(58) Field of Classification Search
USPC .......... 715/212, 220, 229; 707/2, 3, 203, 713, 707/759, 638
See application file for complete search history.

(56) References Cited

U.S. PATENT DOCUMENTS

| | | | |
|---|---|---|---|
| 5,303,146 A * | 4/1994 | Ammirato et al. | 715/204 |
| 5,539,903 A * | 7/1996 | Kaplan et al. | 707/103 R |
| 5,630,122 A * | 5/1997 | Kaplan et al. | 707/4 |
| 6,397,207 B1 | 5/2002 | Bleizeffer et al. | |
| 6,490,620 B1 | 12/2002 | Ditmer et al. | |
| 6,631,402 B1 | 10/2003 | Devine et al. | |
| 6,698,013 B1 * | 2/2004 | Bertero et al. | 717/127 |
| 6,850,932 B2 * | 2/2005 | de Judicibus | 707/3 |
| 7,409,398 B1 * | 8/2008 | Flam et al. | 707/100 |
| 2002/0133488 A1 | 9/2002 | Bellis et al. | |
| 2002/0194186 A1 | 12/2002 | Ode | |
| 2004/0117731 A1 * | 6/2004 | Blyashov | 715/507 |
| 2004/0158563 A1 | 8/2004 | Pawlowski et al. | |
| 2005/0114308 A1 | 5/2005 | Hyland et al. | |
| 2005/0253874 A1 | 11/2005 | Lal et al. | |
| 2006/0080594 A1 * | 4/2006 | Chavoustie et al. | 715/503 |
| 2006/0085738 A1 * | 4/2006 | Chapus et al. | 715/513 |
| 2006/0143243 A1 * | 6/2006 | Polo-Malouvier et al. | 707/203 |
| 2007/0011211 A1 * | 1/2007 | Reeves et al. | 707/203 |
| 2007/0055688 A1 * | 3/2007 | Blattner | 707/102 |

FOREIGN PATENT DOCUMENTS

| | | | |
|---|---|---|---|
| CA | 2264321 A1 | | 9/2000 |
| WO | WO 2005081126 A2 * | | 9/2005 |

OTHER PUBLICATIONS

Lane, Paul, Oracle® Database, Data Warehousing Guide 10g Release 1 (10.1), Part No. B10736-01, Dec. 2003 http://stanford.edu/dept/itss/docs/oracle/10g/server.101/b10736.pdf.*
Jewett, Tom, "SQL technique: subqueries", Database design with UML and SQL © 2005, Archived Dec. 16, 2005.*

(Continued)

*Primary Examiner* — Adam M Queler
(74) *Attorney, Agent, or Firm* — Nicholas Chen; Kate Drakos; Micky Minhas

(57) ABSTRACT

Various technologies and techniques are disclosed for persisting instance-level report customizations. Input is received from a user to run an original report. An original query associated with the original report is executed against a data store. The original report is displayed to the user. At least one instance-level customization is received from the user to customize an instance of the original report. The instance-level customizations that the user makes to the customized report are tracked in a manner that allows a history of changes from the original report to the customized report to be determined. The customized report is generated in subsequent executions of the report. The instance-level changes the user made to the report can be audited to allow users to see the changes made to the original report.

20 Claims, 11 Drawing Sheets

(56) References Cited

OTHER PUBLICATIONS

Bortoluzzi, et al., "A Clinical Report Management System based upon the DICOM Structured Report Standard", The Computer Society, Proceedings of the 16th IEEE Symposium on Computer-Based Medical Systems (CBMS'03), ISBN: 0-7695-1901-6, Jun. 26-27, 2003, pp. 183-188.

Chan, Daniel K.C. "A Document-driven Approach to Database Report Generation", Marie Curie Fellowship from the European Commission (ERBFMBICT960653), Database and Expert Systems Applications, 1998. Proceedings. Ninth International Workshop, ISBN: 0-8186-8353-8, Aug. 25-28, 1998, pp. 925-930.

Tarassenko, et al., "System for database reports generating", Science and Technology, 2001. KORUS '01, Proceedings. The Fifth Russian-Korean International Symposium, ISBN: 0-7803-7008-2, vol. 1, Jun. 26-Jul. 3, 2001, pp. 84-88.

Petropoulos, et al., "XML Query Forms (XQForms): Declarative Specification of XML Query Interfaces", ACM 1-58113-348-0/01/0005, Enosys Markets Inc., May 1-5, 2001, pp. 642-651.

* cited by examiner

PERSISTING INSTANCE-LEVEL REPORT CUSTOMIZATIONS

BACKGROUND

When creating a report, it is common in certain scenarios for the user to desire to customize the actual instance data returned by the report. These customizations include renaming items/editing values, re-ordering items, creating ad-hoc groupings of items, and collapsing multiple items into a single item. While making such changes manually is fairly straightforward in a spreadsheet or similar application, such an approach can be difficult to repeat, reverse, and audit. With some reporting applications, the user is also able to make such changes to the data, but the changes cannot be audited and are lost the next time the report is run.

SUMMARY

Various technologies and techniques are disclosed for persisting instance-level report customizations. Input is received from a user to run an original report. An original query associated with the original report is executed against a data store. The original report is displayed to the user. At least one instance-level customization is received from the user to customize the instance data of the original report. The instance-level customizations that the user makes to the customized report are tracked in a manner that allows a history of changes from the original report to the customized report to be determined. The customized report is generated in subsequent executions of the report. The instance-level changes the user made to the report can be audited to allow users to see the changes made to the original report.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 11 is a simulated screen for one implementation of the system of FIG. 1 that illustrates a report viewer that visually indicates a user has modified the report.

DETAILED DESCRIPTION

Figure 1:
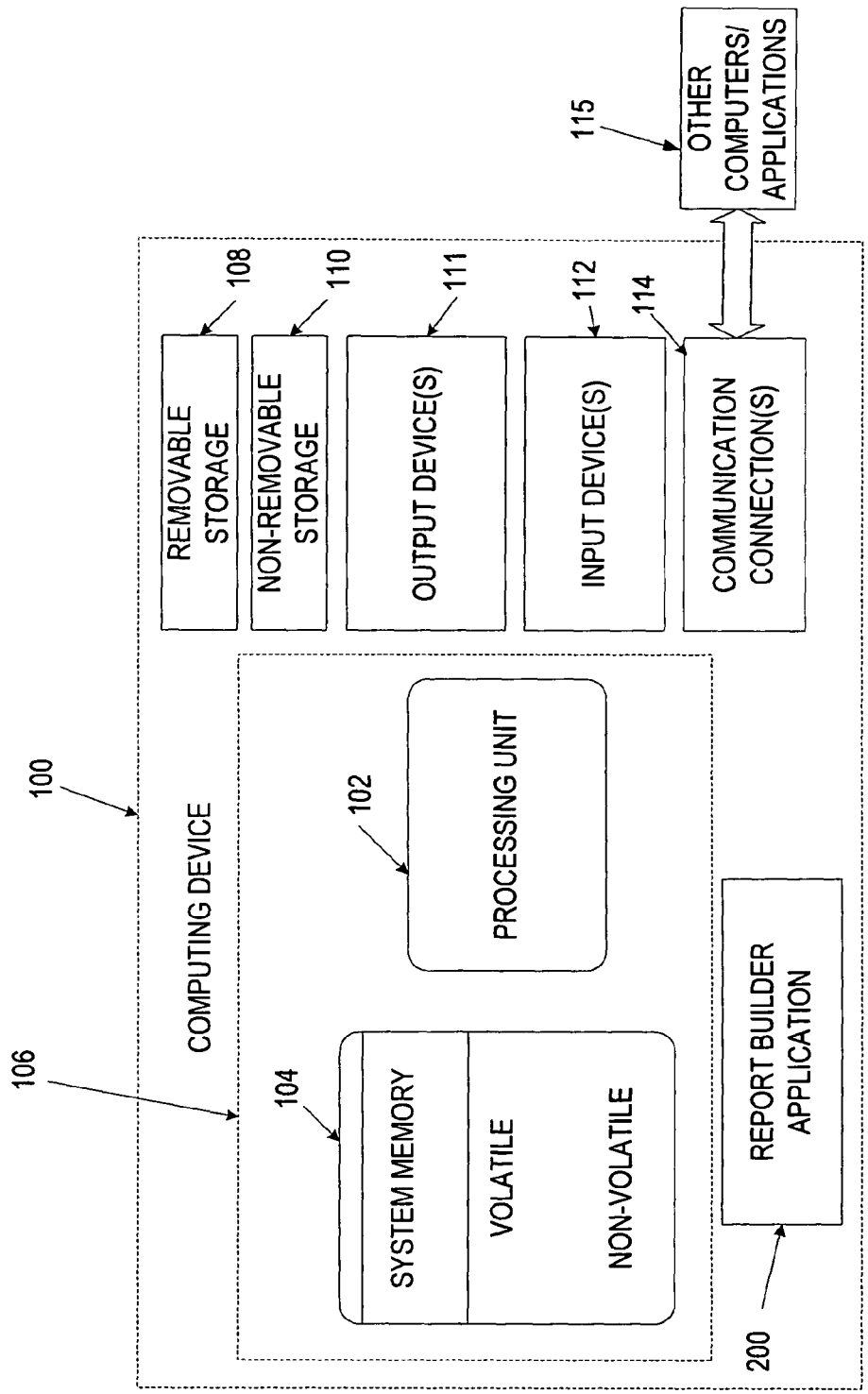
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a report builder application, but the system also serves other purposes in addition to these. In one implementation, one or more of the techniques described herein can be implemented as features within a program such as MICROSOFT® SQL Server Report Builder, or from any other type of program or service that allows a user to create and/or manipulate reports.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes report builder application 200. Report builder application 200 will be described in further detail in FIG. 2.

Figure 2:
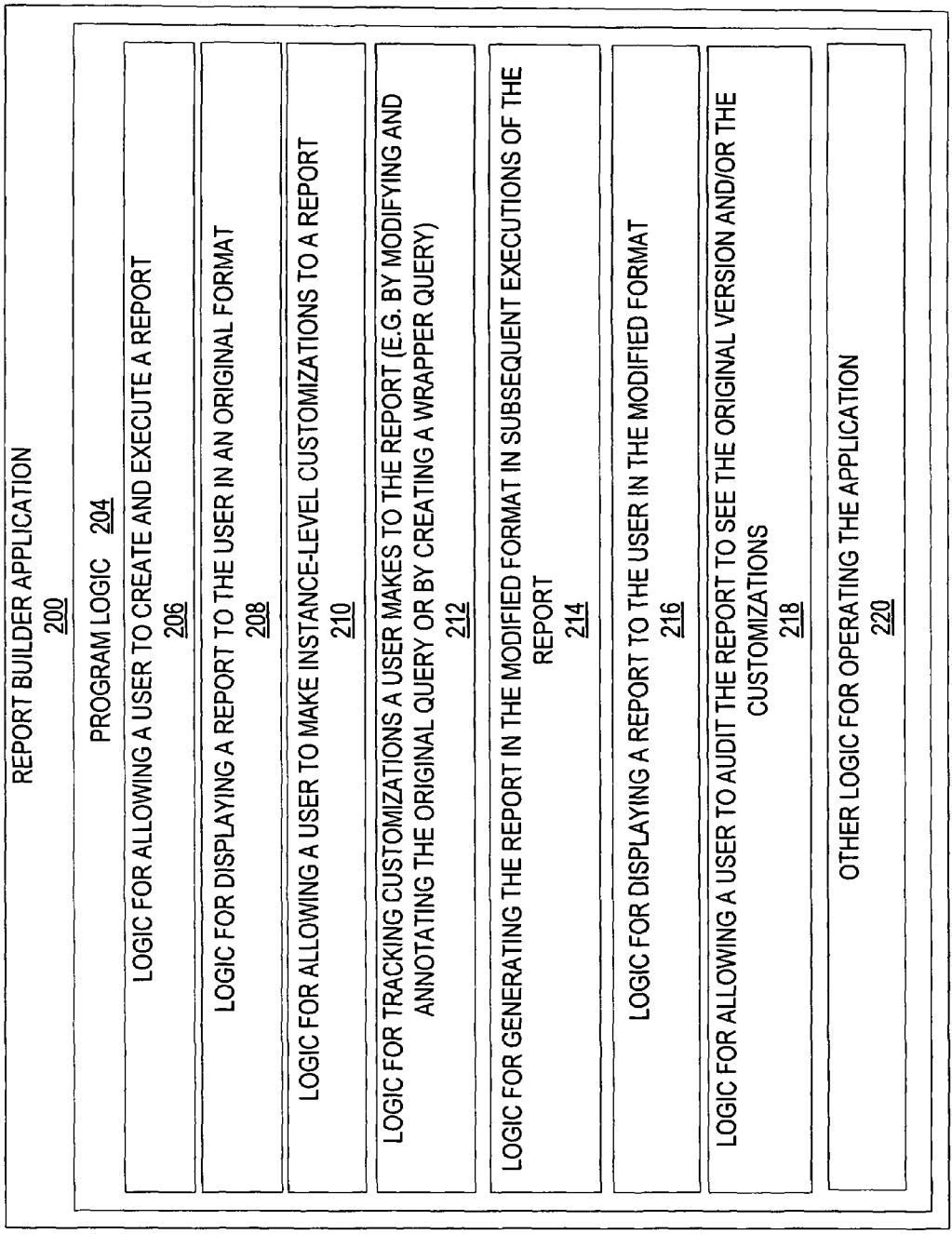
FIG. 2 is a diagrammatic view of a report builder application of one implementation operating on the computer system of FIG. 1.

Turning now to FIG. 2 with continued reference to FIG. 1, a report builder application 200 operating on computing device 100 is illustrated. Report builder application 200 is one of the application programs that reside on computing device 100. However, it will be understood that report builder application 200 can alternatively or additionally be embodied as computer-executable instructions on one or more computers and/or in different variations than shown on FIG. 1. Alternatively or additionally, one or more parts of report builder application 200 can be part of system memory 104, on other computers, applications, and/or devices 115, or other such variations as would occur to one in the computer software art.

Report builder application 200 includes program logic 204, which is responsible for carrying out some or all of the techniques described herein. Program logic 204 includes logic for allowing a user to create and execute a report 206; logic for displaying a report to the user in an original format 208; logic for allowing a user to make instance-level customizations to a report 210; logic for tracking instance-level customizations a user makes to the report (e.g. by modifying and annotating the original query or by creating a wrapper query) 212; logic for generating the report in the modified format in subsequent executions of the report 214; logic for displaying a report to the user in the modified format 216; logic for allowing a user to audit the report to see the original version and/or the customizations 218; and other logic for operating the application 220. In one implementation, program logic 204 is operable to be called programmatically from another program, such as using a single call to a procedure in program logic 204.

Figure 3:
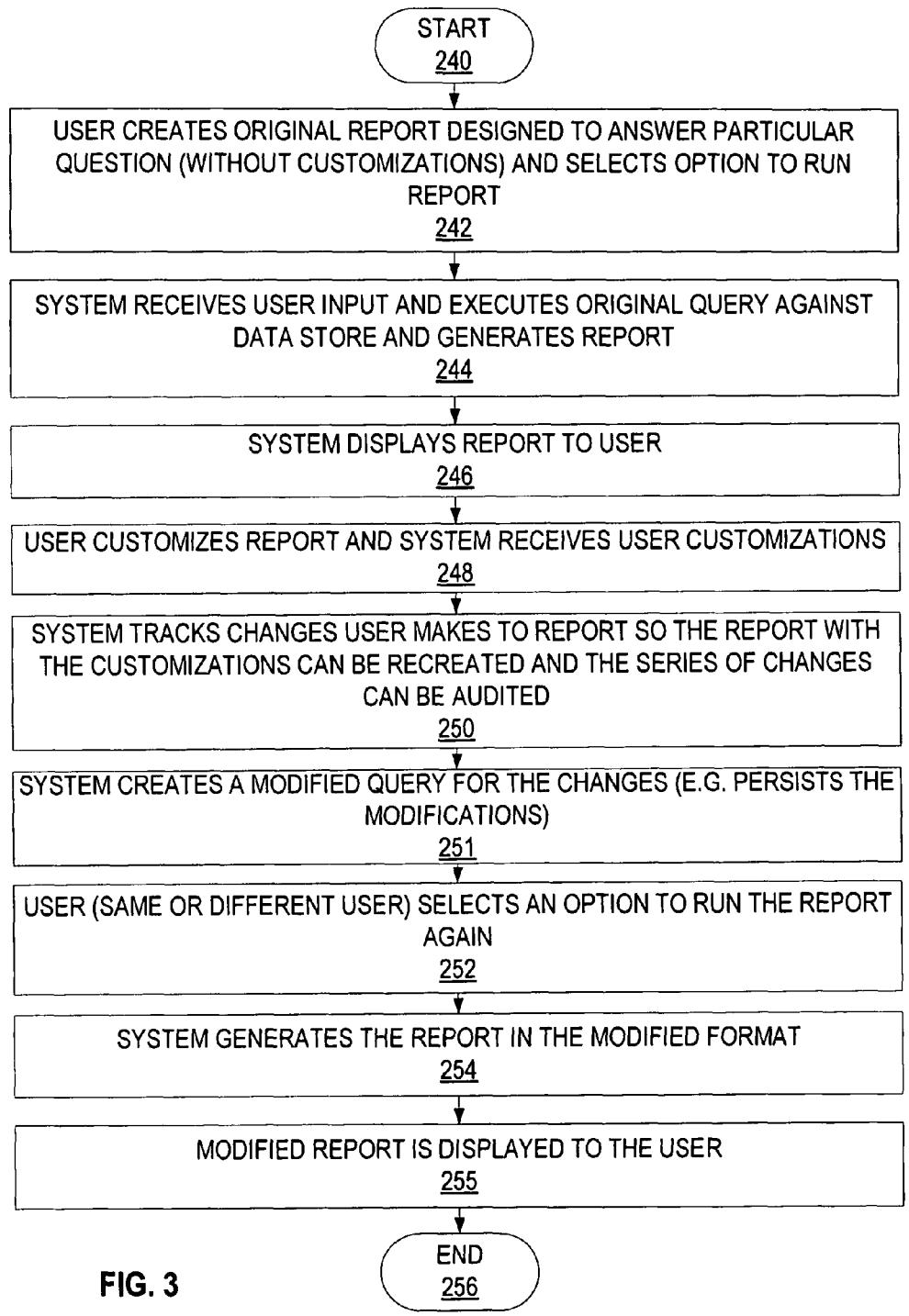
FIG. 3 is a high-level process flow diagram for one implementation of the system of FIG. 1.

Turning now to FIGS. 3-10 with continued reference to FIGS. 1-2, the stages for implementing one or more implementations of report builder application 200 are described in further detail. FIG. 3 is a high level process flow diagram for report builder application 200. In one form, the process of FIG. 3 is at least partially implemented in the operating logic of computing device 100.

The procedure begins at start point 240 with the user creating an original report designed to answer a particular question (without customizations) and selecting an option to run the report (stage 242). The system receives the user input, executes the original query against data store, and generates report (stage 244). The system displays the report to the user (stage 246). The user customizes the report and the system receives the user customizations (stage 248). The system tracks changes the user makes to the report so the report with the customizations can be recreated and the series of changes can be audited (stage 250). The system creates a modified query for the changes (e.g. persists the modifications) (stage 251). The user (same or different user) selects an option to run the report again (stage 252). The system generates the report in the modified format (stage 254). The modified report is displayed to the user (stage 255). The process ends at end point 256.

Figure 4:
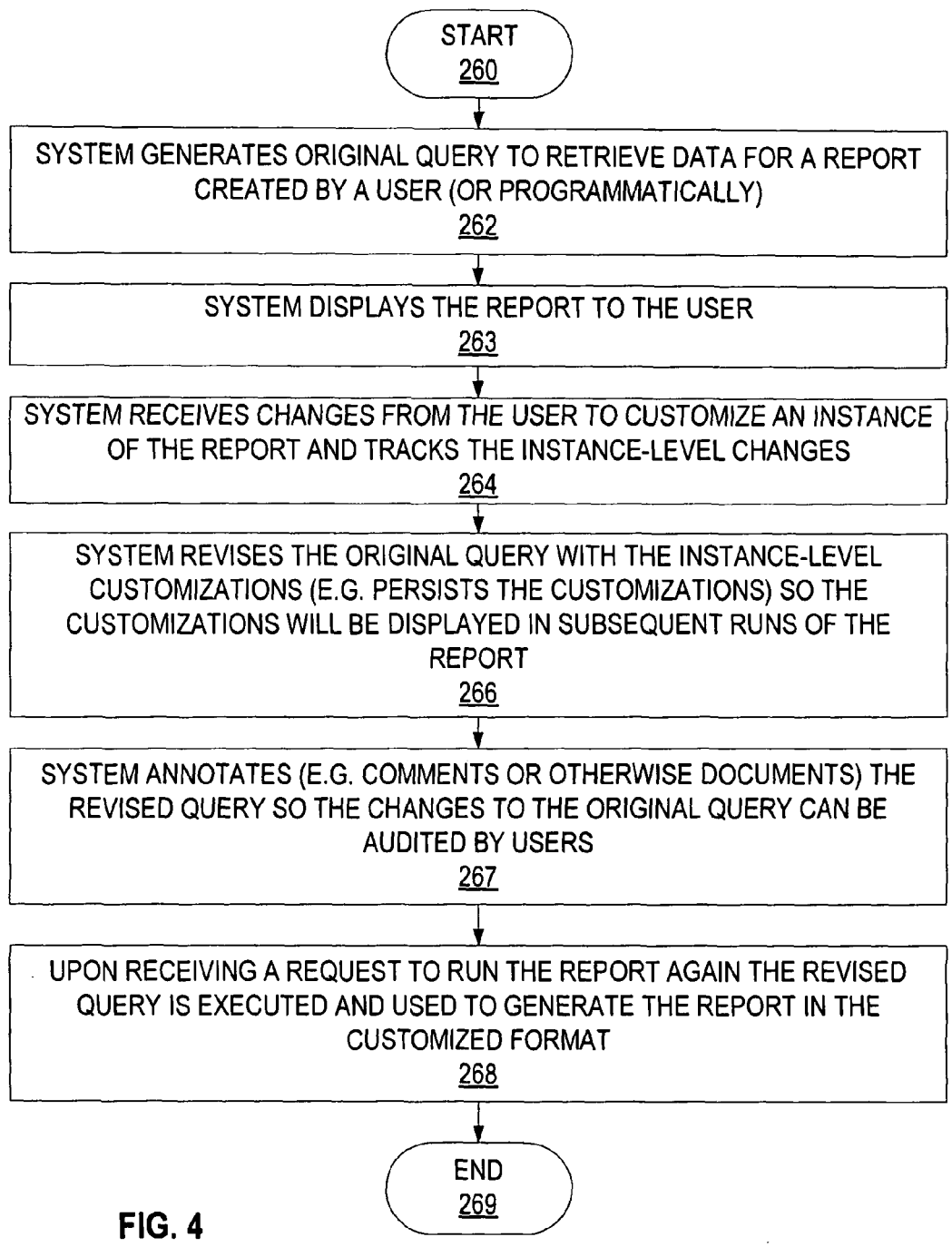
FIG. 4 is a process flow diagram for one implementation of the system of FIG. 1 illustrating the stages involved in customizing a report by annotating the original query.

FIG. 4 illustrates one implementation of a more detailed process for customizing a report by annotating the original query. In one form, the process of FIG. 4 is at least partially implemented in the operating logic of computing device 100. The procedure begins at start point 260 with system generating an original query to retrieve data for a report created by a user (or programmatically) (stage 262). The system displays the report to the user (stage 263). The system receives changes from the user to customize an instance of the report and tracks the instance-level changes (stage 264). The system revises the original query with the instance-level customizations so the customizations will be displayed in subsequent runs of the report (stage 266). The system annotates (e.g. comments or otherwise documents) the revised query so the changes to the original query can be audited by users (stage 267). Upon receiving a request to run the report again, the revised query is executed and used to generate the report in the customized format (stage 268). The process ends at end point 269.

Figure 5:
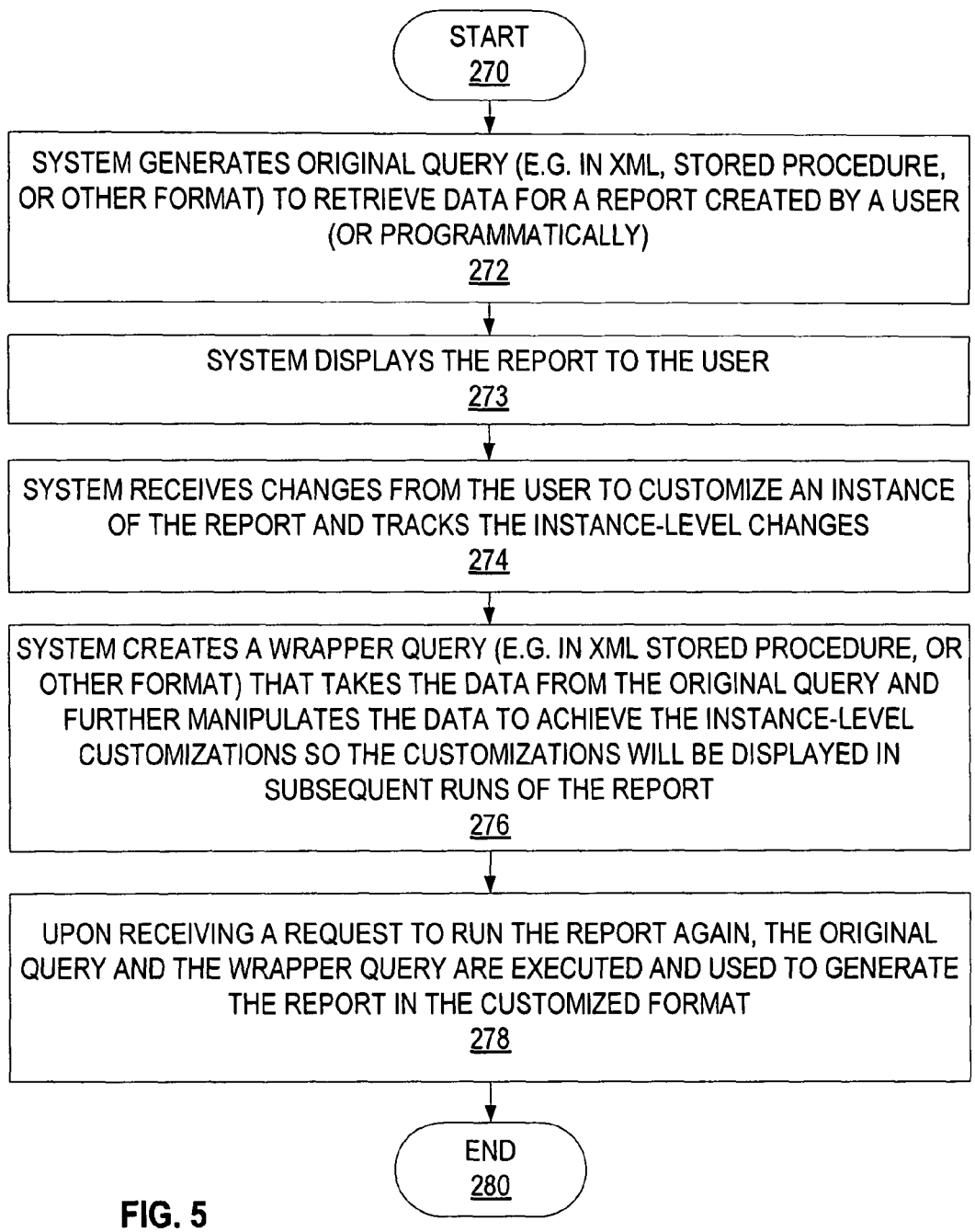
FIG. 5 is a process flow diagram for one implementation of the system of FIG. 1 illustrating the stages involved in customizing a report by creating a wrapper query.

FIG. 5 illustrates one implementation of the stages involved in customizing a report by creating a wrapper query. In one form, the process of FIG. 5 is at least partially implemented in the operating logic of computing device 100. The procedure begins at start point 270 with the system generating an original query (e.g. in XML, stored procedure, or other format) to retrieve data for a report created by a user (or programmatically) (stage 272). The system displays the report to the user (stage 273). The system receives changes from the user to customize an instance of the report and tracks the instance-level changes (stage 274). The system creates a wrapper query (e.g. in XML stored procedure, or other format) that takes the data from the original query and further manipulates the data to achieve the instance-level customizations so the customizations will be displayed in subsequent runs of the report (stage 276). Upon receiving a request to run the report again, the original query and the wrapper query are executed and used to generate the report in the customized format (stage 278). The process ends at end point 280.

Figure 6:
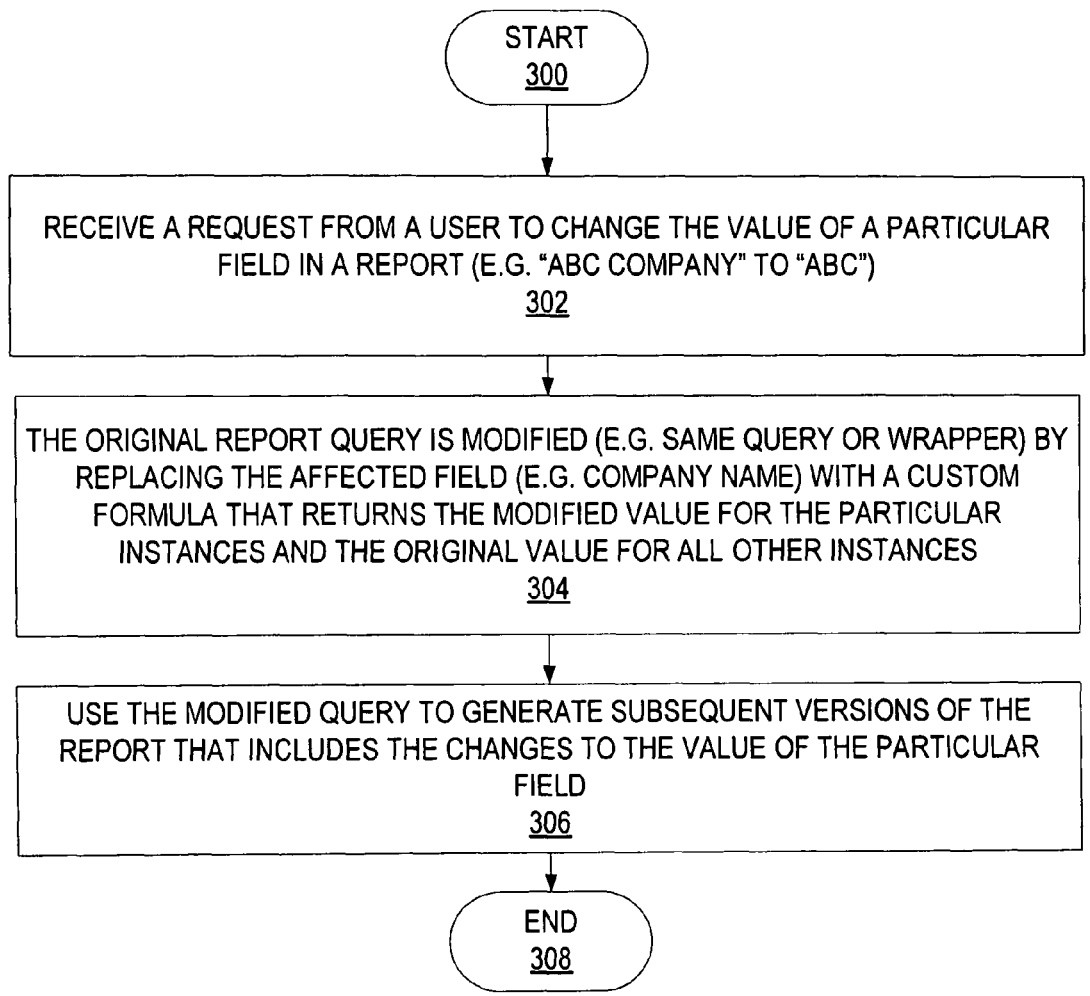
FIG. 6 is a process flow diagram for one implementation of the system of FIG. 1 illustrating the stages involved in allowing a user to customize a particular field in a report.

FIG. 6 illustrates the process for allowing a user to customize a particular field in a report in one implementation in more detail. In one form, the process of FIG. 6 is at least partially implemented in the operating logic of computing device 100. The procedure begins at start point 300 with receiving a request from a user to change the value of a particular field in a report (e.g. "ABC Company" to "ABC") (stage 302). The original report query is modified (e.g. same query or wrapper) by replacing the affected field (e.g. company name) with a custom formula that returns the modified value for the particular instances and the original value for all other instances (stage 304). The modified query is used to generate subsequent versions of the report that includes the changes to the value of the particular field (stage 306). The process ends at end point 308.

Figure 7:
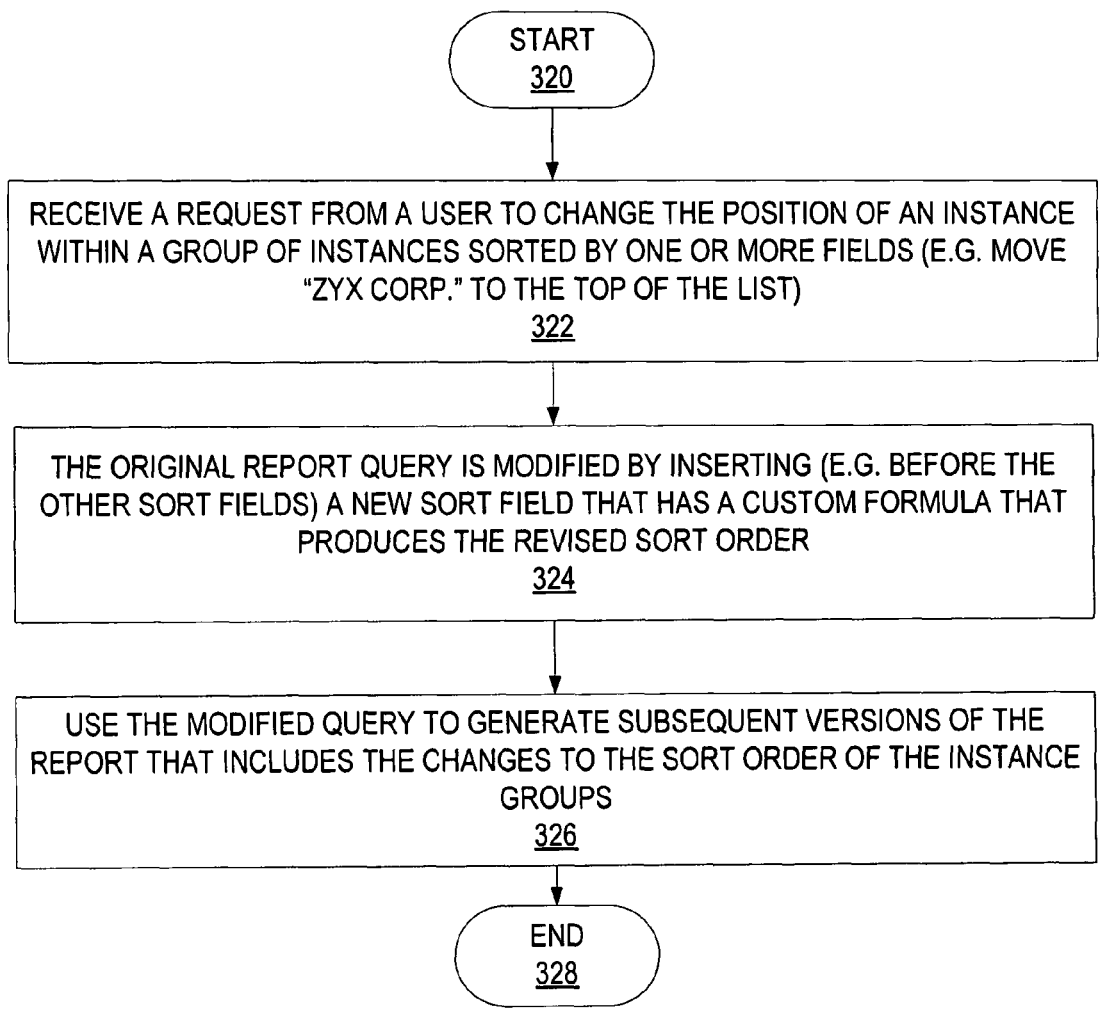
FIG. 7 is a process flow diagram for one implementation of the system of FIG. 1 illustrating the stages involved in allowing a user to change the position of an instance within a group of instances in a report.

FIG. 7 is a process flow diagram for one implementation that illustrates allowing a user to change the position of an instance within a group of instances in a report. In one form, the process of FIG. 7 is at least partially implemented in the operating logic of computing device 100. The procedure begins at start point 320 with receiving a request from a user to change the position of an instance within a group of instances sorted by one or more fields (e.g. move "ZYX Corp." to the top of the list) (stage 322). The original report query is modified by inserting a new sort field before any existing sort fields, the new field having a custom formula that produces the revised sort order (stage 324).

Let's take a look at a non-limiting hypothetical example of how this could work. Given an instance Q immediately following the new position of ZYX Corp., the new sort field has a custom formula that returns one of three values:

1=the instance is not ZYX Corp. and would normally be sorted before Q (based on the remaining sort fields).
2=the instance is ZYX Corp.
3=the instance is not ZYX Corp. and would normally be sorted at or after Q.

The modified query is used to generate subsequent versions of the report that includes the changes to the sort order of the instance groups (stage 326). The process ends at end point 328.

Figure 8:
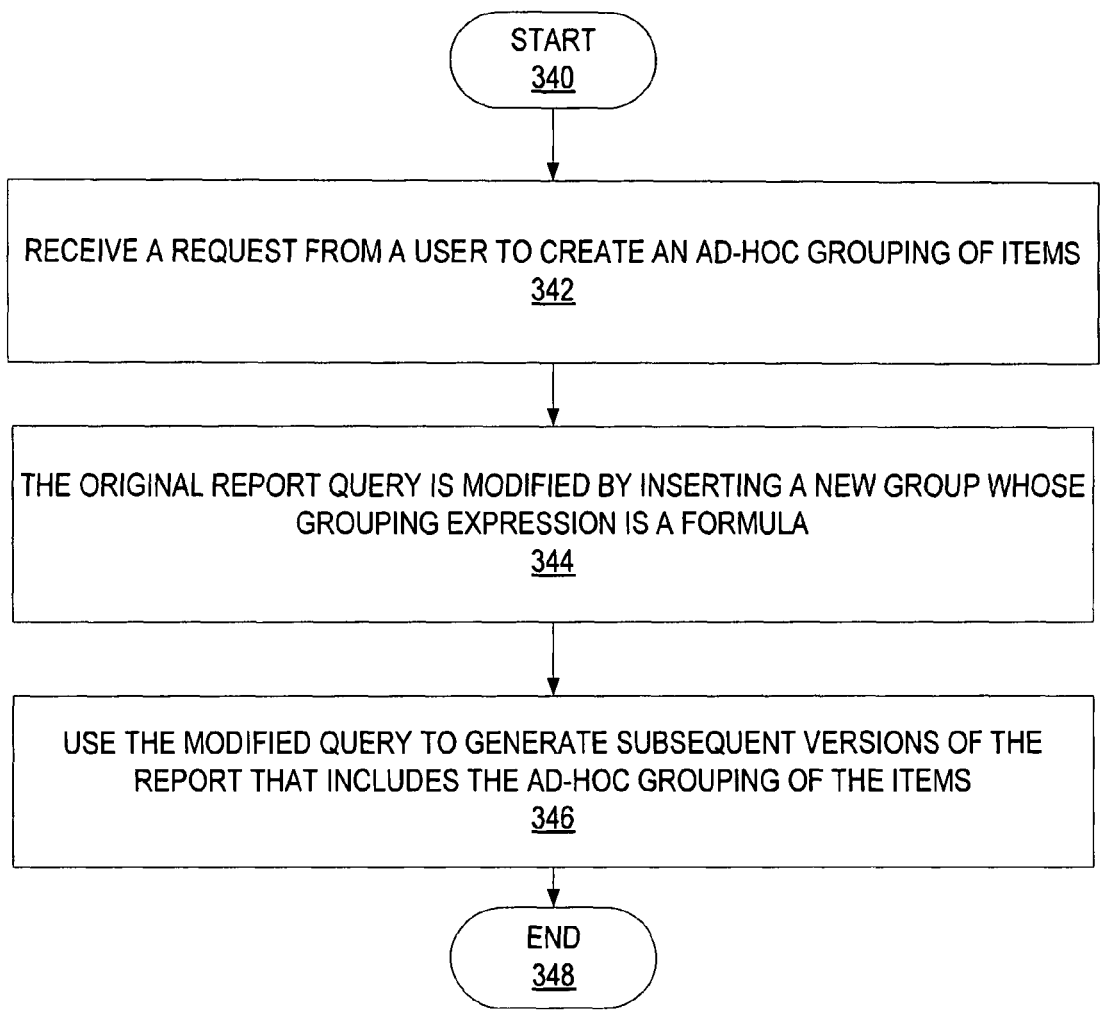
FIG. 8 is a process flow diagram for one implementation of the system of FIG. 1 illustrating the stages involved in allowing a user to create an ad-hoc grouping of items in a report.

FIG. 8 is a process flow diagram for one implementation that illustrates allowing a user to create an ad-hoc grouping of items in a report. In one form, the process of FIG. 8 is at least partially implemented in the operating logic of computing device 100. The procedure begins at start point 340 with receiving a request from a user to create and ad-hoc grouping of items (stage 342). The original report query is modified by inserting a new group whose grouping expression is a formula (stage 344). Here is a non-limiting example of an ad-hoc grouping:

SWITCH(IN(<InstanceRef>, {Key1, Key2, Key3}), "Group1", IN(<InstanceRef>, {Key4,Key5}, "Group2", . . . )

The modified query is used to generate subsequent versions of the report that includes the ad-hoc groupings of the items (stage 346). The process ends at end point 348.

Figure 9:
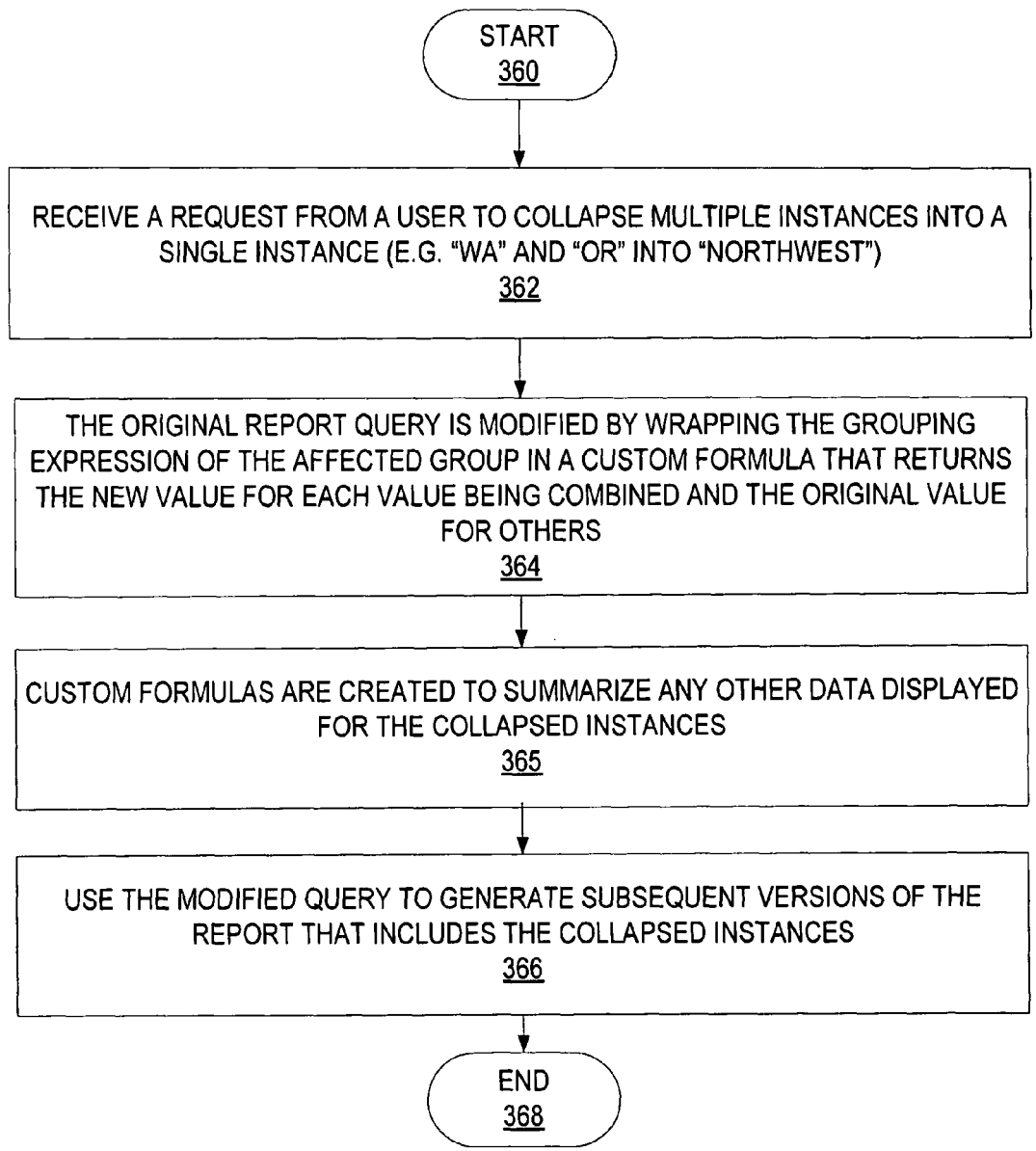
FIG. 9 is a process flow diagram for one implementation of the system of FIG. 1 illustrating the stages involved in allowing a user to collapse multiple instances into a single instance in a report.

FIG. 9 is a process flow diagram for one implementation that illustrates allowing a user to collapse multiple instances into a single instance in a report. In one form, the process of FIG. 9 is at least partially implemented in the operating logic of computing device 100. The procedure begins at start point 360 with receiving a request from a user to collapse multiple instances into a single instance (e.g. "WA" and "OR" into "Northwest") (stage 362). The original report query is modified by wrapping the grouping expression of the affected group in a custom formula that returns the new value for each value being combined and the original value for others (stage 364). In addition, custom formulas are created to summarize any other data displayed for the collapsed instances (stage 365). The modified query is used to generate subsequent versions of the report that includes the collapsed instances (stage 366). The process ends at end point 368.

Figure 10:
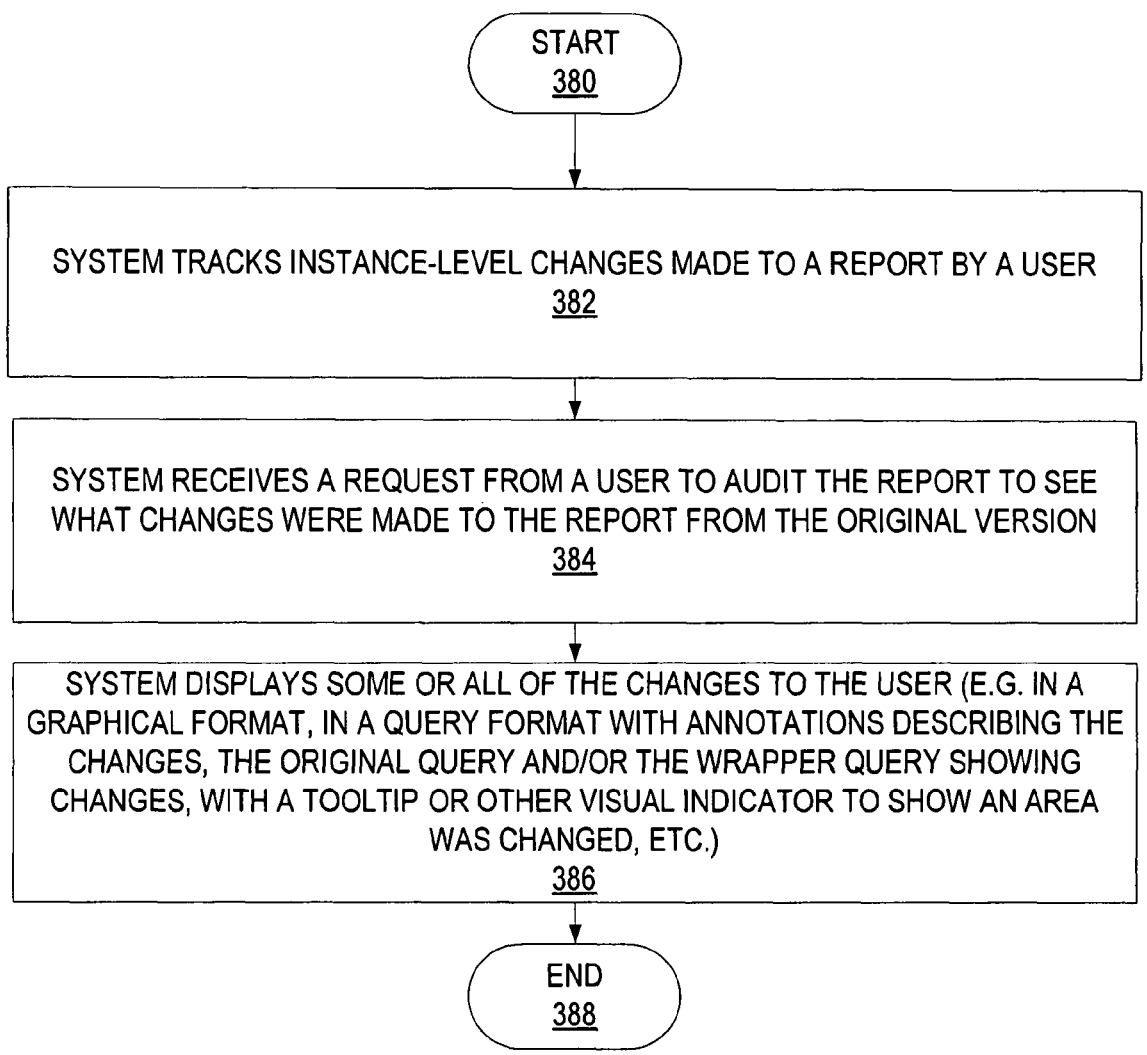
FIG. 10 is a process flow diagram for one implementation of the system of FIG. 1 illustrating the stages involved in allowing a user to audit changes made to a report.

FIG. 10 is a process flow diagram for one implementation that illustrates allowing a user to audit changes made to a report. In one form, the process of FIG. 10 is at least partially implemented in the operating logic of computing device 100. The procedure begins at start point 380 with the system tracking instance-level changes made to a report by a user (stage 382). The system receives a request from a user to audit the report to see what changes were made to the report from the original version (stage 384). The system displays some or all of the changes to the user (e.g. in a graphical format, in a query format with annotations describing the changes, the original query and/or the wrapper query showing changes, with a tooltip or other visual indicator to show an area was changed, etc.) (stage 386). The process ends at end point 388.

Figure 11:
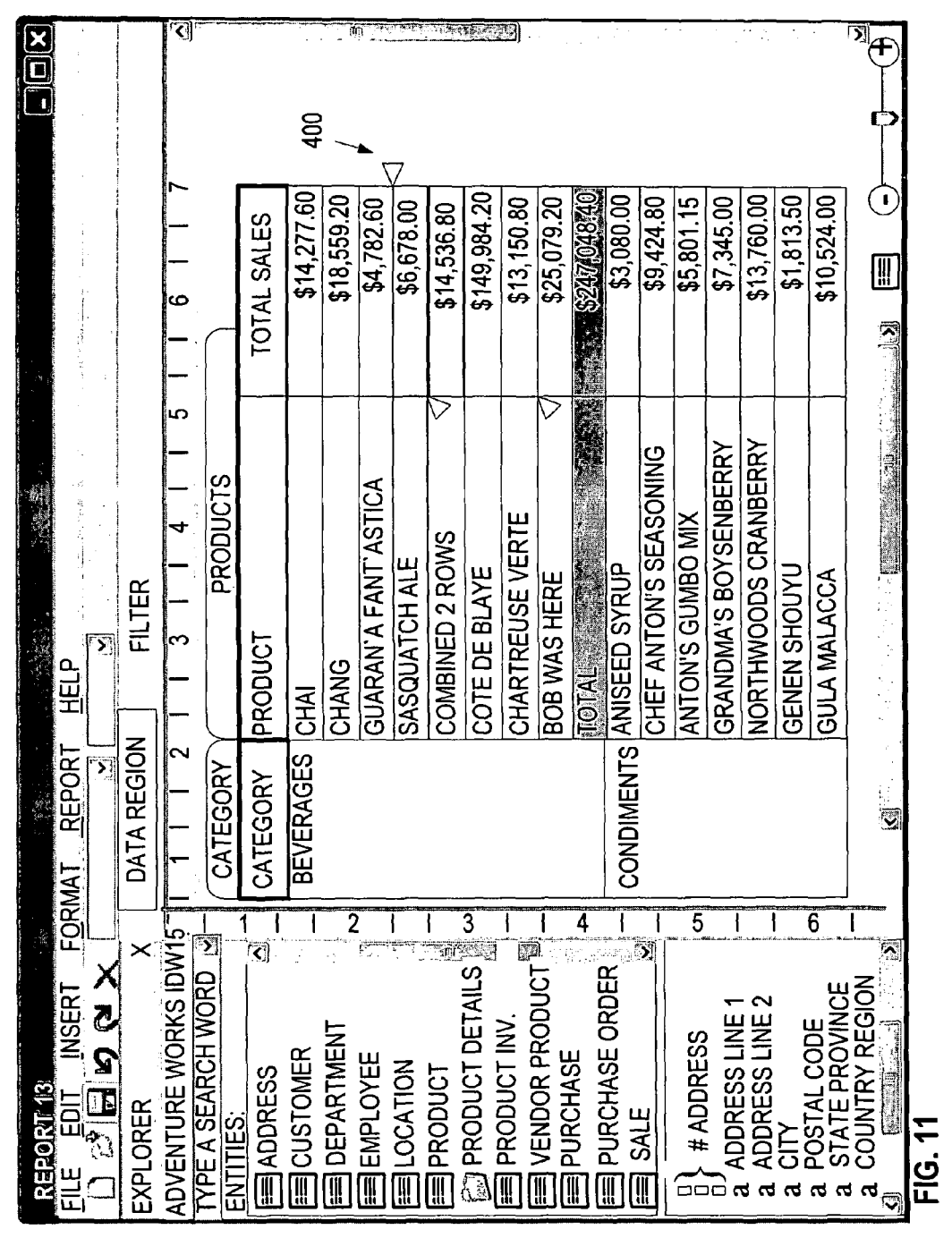

Turning now to FIG. 11, a simulated screen is shown to illustrate a user interface of a report builder that shows using tooltips to indicate instance-level customizations a user made to a particular report. This screen can be displayed to users on output device(s) 111. Furthermore, this screen can receive input from users from input device(s) 112. The screen has a tooltip 400 to indicate that a row was deleted by the user in the instance-level version of the report. Tooltips can also be used to show that rows were changed, collapsed, and/or otherwise modified.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for persisting instance-level report customizations comprising the steps of:
   receiving input from a user to run an original report;
   executing an original query associated with the original report against a data store to generate the original report, the original report including an instance of original data;
   displaying the original report to the user;
   receiving at least one instance-level customization from the user to customize the instance of original data displayed in the original report to generate a customized report, the at least one instance-level customization including changing a value of a particular field for a particular one or more instances of the field in the original report;
   tracking the at least one instance-level customization that the user makes to the customized report in a manner that allows a history of changes from the original report to the customized report to be determined;
   generating a wrapper query that can be executed after the original query to manipulate the instance of original data that was generated by executing the original query to achieve the at least one instance-level customization, said generating a wrapper query comprising annotating the wrapper query so that the at least one instance-level customization made to the original report can be audited;
   upon receiving input from a user to generate the original report in a modified format, executing the original query to generate an original query result set, and executing the wrapper query to filter the original query result set to generate the customized report to include the at least one instance-level customization; and
   upon receiving user input to generate the original report, executing the original query associated with the original report against the data store to generate the original report.

2. The method of claim 1, wherein the customization is persisted using a custom formula that returns the changed value for the particular field for the particular one or more instances of the field and returns an original value for the particular field for all remaining records.

3. The method of claim 1, wherein the at least one instance-level customization includes changing a position of an instance within a group of instances sorted by one or more fields.

4. The method of claim 3, wherein the customization is persisted using a new sort field that has a custom formula that produces the changed position of the instance.

5. The method of claim 1, wherein the at least one instance-level customization includes creating an ad-hoc grouping of items.

6. The method of claim 5, wherein the ad-hoc grouping of items is achieved by inserting a new group whose grouping expression is a formula.

7. The method of claim 1, wherein the at least one instance-level customization includes collapsing multiple instances into a single instance.

8. The method of claim 7, wherein the customization is persisted by wrapping a grouping expression of an affected group into a custom formula that returns a new value for each value in the affected group being combined and an original value for all other values in the affected group.

9. A computer storage medium that stores computer-executable instructions for causing a computer to perform the steps recited in claim 1.

10. A computing device, comprising:
   at least one processing unit; and
   memory that stores computer readable instructions, the at least one processing unit configured to execute the computer readable instructions to enable the computing device to:
      provide a user with an ability to make one or more instance-level customizations in a report generated by executing an original query, the one or more instance-level customizations including changing a value of a particular filed for a particular one or more instances of the field in the report;
      track the one or more instance-level customizations the user makes to the report by creating a wrapper query that can be executed after the original query to manipulate data in the report that was generated by executing the original query to achieve the one or more instance-level customizations, the one or more instance-level customizations being further tracked by including in the wrapper query one or more annotations to describe what changed;
      upon receiving a user input, generate the report in a modified format that includes the one or more instance-level customizations on a subsequent run of the report by executing the original query to generate an original query result set and executing the wrapper query to filter the original query result set to generate the report in the modified format to include the one or more instance-level customizations;
      provide a feature to allow the user to audit the report to see how an original version of the report was modified by the one or more instance-level customizations; and
      upon receiving another user input, generate the original report by executing the original query.

11. The computing device of claim 10, wherein a customization of the one or more instance-level customizations is persisted using a custom formula that returns the changed value for the particular field for the particular one or more instances of the field and returns an original value for the particular field for all remaining records.

12. The computing device of claim 10, wherein a customization of the one or more instance-level customizations includes changing a position of an instance within a group of instances sorted by one or more fields.

13. The computing device of claim 12, wherein the customization is persisted using a new sort field that has a custom formula that produces the changed position of the instance.

14. The computing device of claim 10, wherein a customization of the one or more instance-level customizations includes creating an ad-hoc grouping of items.

15. The computing device of claim 14, wherein the ad-hoc grouping of items is achieved by inserting a new group whose grouping expression is a formula.

16. The computing device of claim 10, wherein a customization of the one or more instance-level customizations includes collapsing multiple instances into a single instance.

17. The computing device of claim 16, wherein the customization is persisted by wrapping a grouping expression of an affected group into a custom formula that returns a new value for each value in the affected group being combined and an original value for all other values in the affected group.

18. A method for auditing changes made to an instance of a report comprising the steps of:
   tracking one or more instance-level changes a user makes to a report that was generated by executing an original query upon receipt of a request from the user to make the one or more instance-level changes, the one or more instance-level changes including changing a value of a particular field for a particular one or more instances of the field of the original report;
   receiving a request from the user to audit the report to see what changes were made to the report from an original version of the report; and
   displaying at least a portion of the one or more instance-level changes to the user, said displaying including displaying a wrapper query, which comprises annotations describing the one or more instance-level changes, that may be executed after the original query to manipulate data that was generated by the original query to generate the report with the one or more instance-level customizations upon receipt of a input from the user to generate the original report in a modified format, the original query being capable of being executed to generate an instance of the original report upon receipt of user input.

19. The method of claim 18, wherein the displaying step comprises:
   displaying a visual indicator near a particular field in a user interface of a reporting application to indicate visually that the particular field was changed.

20. A computer storage medium that stores computer-executable instructions for causing a computer to perform the steps recited in claim 18.

* * * * *